July 22, 1924.  1,502,557

P. C. C. FRIDRICHSEN

MOUNTING BOARD SHAKING BOX AND BEARING THEREFOR

Filed June 19, 1922

Peter C. C. Fridrichsen, INVENTOR.

BY Geo. T. Kimmel
ATTORNEY.

Patented July 22, 1924.

1,502,557

UNITED STATES PATENT OFFICE.

PETER C. CHRISTIAN FRIDRICHSEN, OF INDEPENDENCE, MISSOURI.

MOUNTING-BOARD SHAKING BOX AND BEARING THEREFOR.

Application filed June 19, 1922. Serial No. 569,204.

*To all whom it may concern:*

Be it known that I, PETER C. C. FRIDRICHSEN, a subject of the King of Denmark, residing at Independence, in the county of Jackson and State of Missouri, have invented certain new and useful Improvements in Mounting-Board Shaking Boxes and Bearings Therefor, of which the following is a specification.

This invention appertains to certain improvements in apparatus used in the manufacture of ceramic or mosaic flooring or other similar tile work, and has for its principal object to provide for a novel form of mounting board shaking box and bearing therefor for effecting the shaking and settling down of a number of tiles or the like placed on the mounting board for the purpose and preparatory to the pasting of the tiles on paper, the tiles taking position spaced apart sufficiently to provide joints therebetween for the filling of the same when the tiles are transferred from the paper to the bed of cement in which they are finally laid.

Another object of the invention is to provide for an apparatus of the class mentioned, and one embodying a simple and effective means whereby the desired shaking or vibrating movements may be readily imparted to the shaking box in a manner to be less laborious than has heretofore been possible in known types of such apparatus.

With the foregoing and other objects in view, the invention resides in the certain novel and useful construction and arrangement of parts as will be hereinafter more fully described, set forth in the appended claims, and illustrated in the accompanying drawing, in which:—

Figure 1:
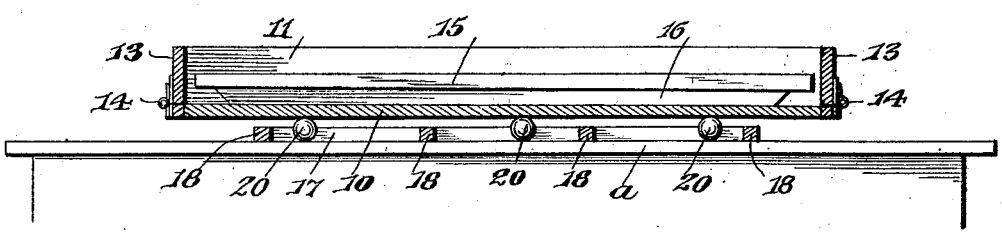
Figure 2:
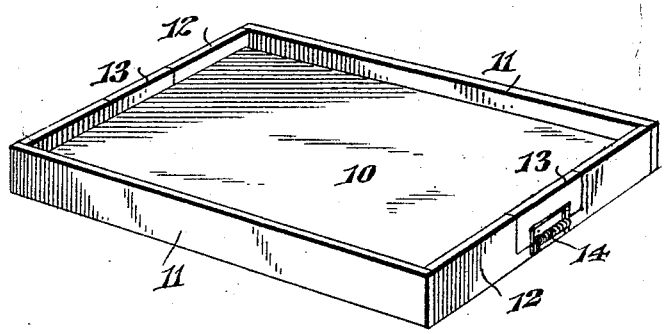
Figure 3:
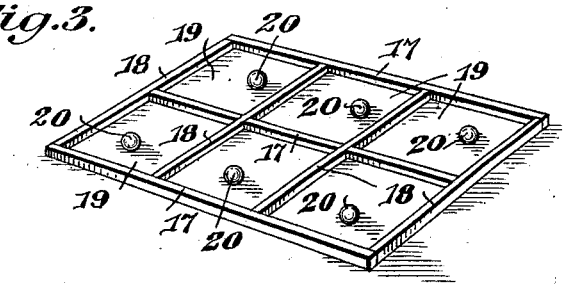

Figure 1 is a vertical longitudinal section through a preferred embodiment of the apparatus and the support on which the same is mounted, Fig. 2 is a perspective view of the shaking box per se, and, Fig. 3 is a similar view of the ball bearing mountings for the shaking box and the confining frame for retaining the same in their operative positions.

Referring to the drawing, the preferred embodiment of the invention as shown therein comprises a substantially rectangular shaking box formed of a bottom wall 10 having oppositely disposed longitudinally extending side walls 11 and similarly disposed end walls 12. The end walls 12 are each formed to provide medially arranged cut portions or flaps 13, which are hinged in position by means of suitable spring tensioned hinges 14. These hinges 14 are disposed exteriorly of the box whereby the cut portions or flaps 13 may be swung outwardly to facilitate the placing within the shaking box or the removal therefrom of a mounting board 15, which is provided on its under side with suitable supports 16, so that the same is placed above the bottom wall 10 of the box, and that the fingers of the operator may be conveniently inserted beneath the opposite edges thereof in the lifting and placing movements of the mounting board.

For supporting the shaking box in position for the desired shaking or vibrating movements thereof, a frame, formed of a plurality of longitudinally extending strips or bars 17 and a greater number of transversely extending strips or bars 18, one equidistantly spaced from the other to provide a series of rectangular openings 19, is secured in position on a table or other work support $a$, and in each opening 19 is placed a ball bearing 20 on which the box is positioned for the purpose.

In the use of the device, a number of tiles (not shown) are to be placed on the mounting board 15 positioned within the shaking box 10 which rests on the ball bearings 20, when the operator will grasp the side or end walls 11 or 12 of the box, and move the box over the balls 20, whereby the tiles will be jostled or shaken into desired positions one with respect to the other as desired. After the tiles have been uniformly set in position, by the shaking or vibrating action imparted to the shaking box, the mounting board may be readily removed from the box by the operator swinging the cut portions or flaps 13 outwardly on their hinges 14 and inserting his or her fingers beneath the exposed edge portions of the mounting board. Immediately upon the withdrawal of the hands of the operator through the flap openings, the portions or flaps 13, will be swung back into their normal positions by the spring action of the hinges 14. It is to be noted that the side and end walls of the shaking box are of a height sufficient to prevent the shaking of any of the tiles from their positions on the mounting board, during the shaking or vibrating movements of the parts.

From the foregoing, it will be readily apparent that, while a preferred embodiment of the invention has been described and illustrated herein in specific terms and details of construction and arrangement, various changes in and modifications of the same may be resorted to without departing from the spirit of the invention, or the scope of the claims appended hereto.

Having thus fully described the invention, what is claimed as new, is:—

1. In a device of the class described, a shaking box formed of a bottom wall and side and end walls, a mounting board adapted to be positioned within said box, the upper surface of said mounting board being disposed in a plane below the top edges of the side and end walls of said box, and flap portions cut from the end walls of said box and hinged for swinging movements outwardly of their normal positions whereby to facilitate the placing of said mounting board in and its removal from position in said box.

2. In a device of the class described, a shaking box formed of a bottom wall and side and end walls, a mounting board adapted to be positioned within said box, the upper surface of said mounting board being disposed in a plane below the top edges of the side and end walls of said box, and flap portions cut from certain of the side or end walls of said box and hinged for swinging movements outwardly of their normal positions whereby to facilitate the placing of said mounting board in and its removal from position in said box.

3. A mounting board shaking box comprising a receptacle formed with an open top and adapted to have a mounting board supported on the bottom thereof, said receptacle of greater height than the mounting board, and portable means for supporting said receptacle, and said receptacle having each of its end walls provided with a hinged flap portion to facilitate the placing and removal of the mounting board in and from said receptacle.

4. A mounting board shaking box comprising an open top receptacle for the reception of a removable mounting board for supporting tiles, a stationary polygonal-shaped frame arranged below said receptacle and provided with longitudinal and transverse strips, means to provide a series of enlarged openings, and portable elements supporting said receptacle and confined within and bodily shiftable from point to point in each of said openings to provide for the imparting to the receptacle of the desired shaking or vibrating movements.

5. A mounting board shaking box comprising a receptacle for the reception of the removable mounting board for supporting tiles, a rectangular frame arranged below said receptacle and formed with longitudinal and transverse strips to provide a plurality of rectangular openings, portable ball bearings confined within said openings and supporting said receptacle and providing means to admit of the imparting to the receptacle the desired shaking or vibrating movements, and said receptacle being of greater height than the height of the mounting board.

6. A mounting board shaking box comprising a receptacle for the reception of the mounting board, a rectangular frame arranged below said receptacle and formed with means to provide a plurality of rectangular openings, portable ball bearings confined within said openings and supporting said receptacle and providing means to admit of the imparting to the receptacle the desired shaking or vibrating movements, and said receptacle provided with hinged flaps to facilitate the placing and removal of the mounting board in and from said receptacle.

In testimony whereof, I affix my signature hereto.

P. C. CHRISTIAN FRIDRICHSEN.